Feb. 8, 1966   M. F. SMITH ETAL   3,233,559
TRANSPORTATION MEANS
Original Filed Jan. 30, 1961   4 Sheets-Sheet 1
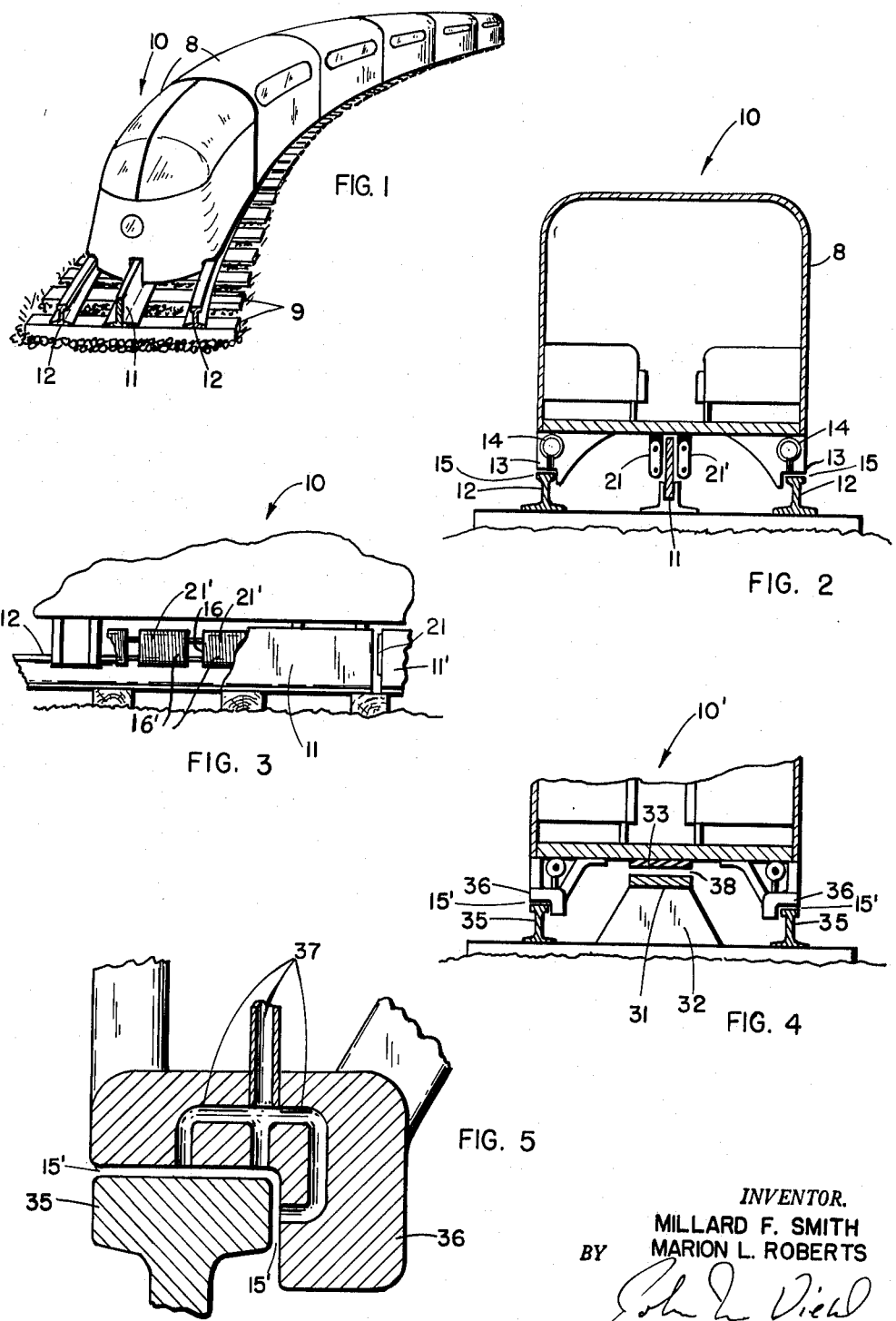
INVENTOR.
MILLARD F. SMITH
BY MARION L. ROBERTS
ATTORNEY

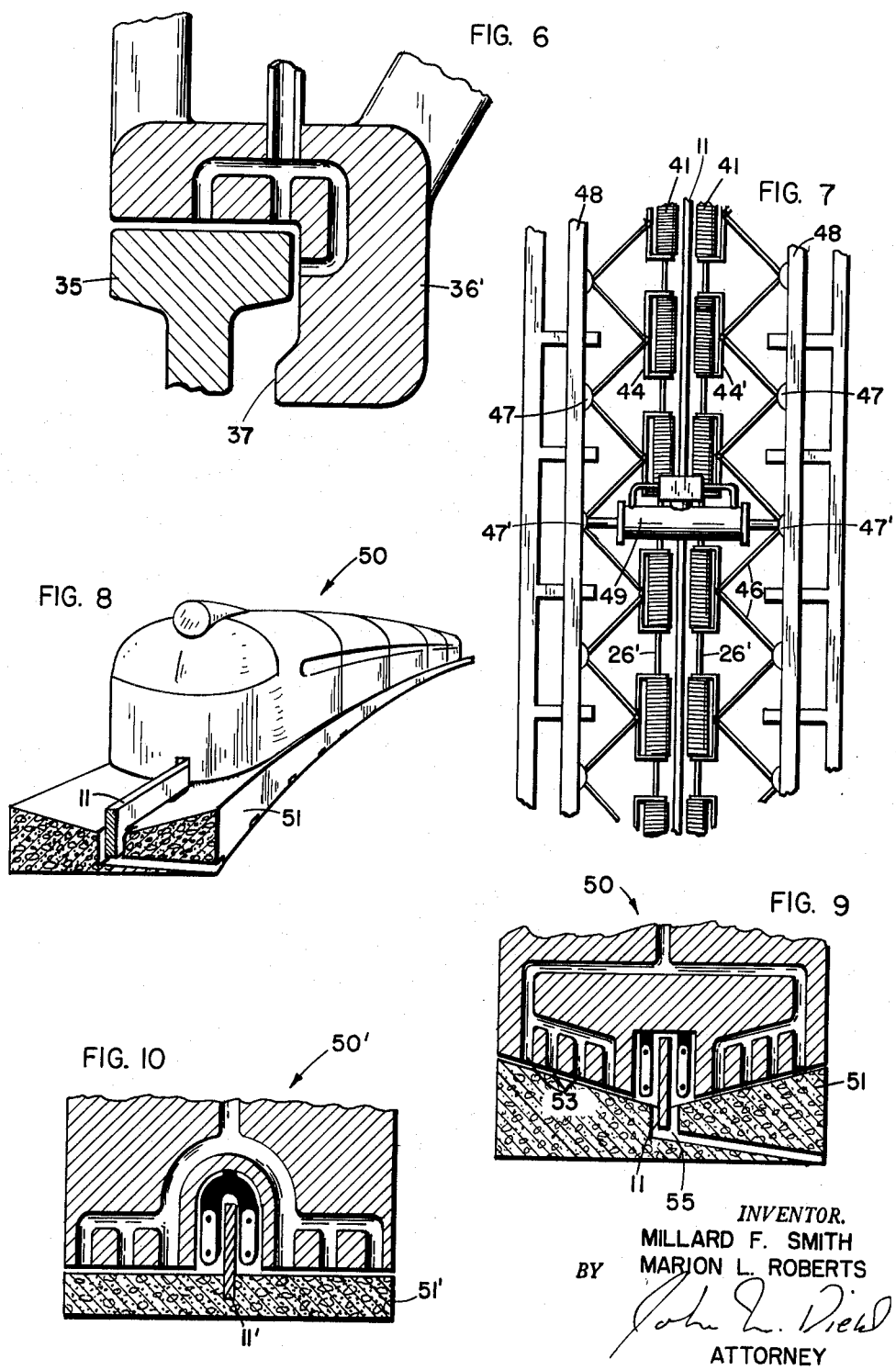

Feb. 8, 1966          M. F. SMITH ETAL          3,233,559
                     TRANSPORTATION MEANS
Original Filed Jan. 30, 1961                    4 Sheets-Sheet 3

*INVENTOR.*
MILLARD F. SMITH
MARION L. ROBERTS
BY
ATTORNEY

Feb. 8, 1966  M. F. SMITH ETAL  3,233,559
TRANSPORTATION MEANS
Original Filed Jan. 30, 1961  4 Sheets-Sheet 4
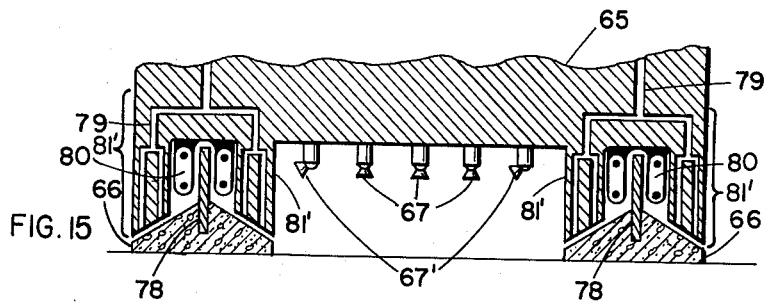
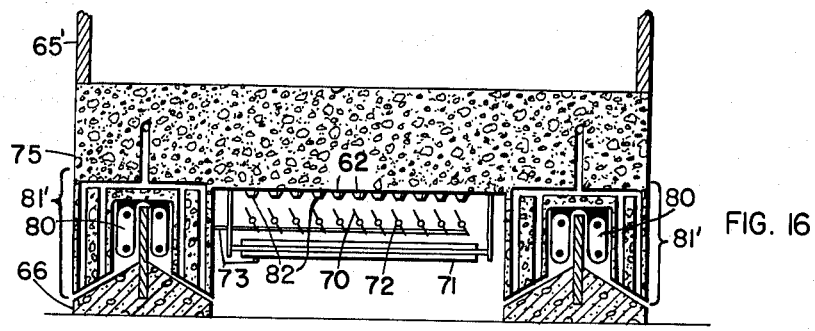
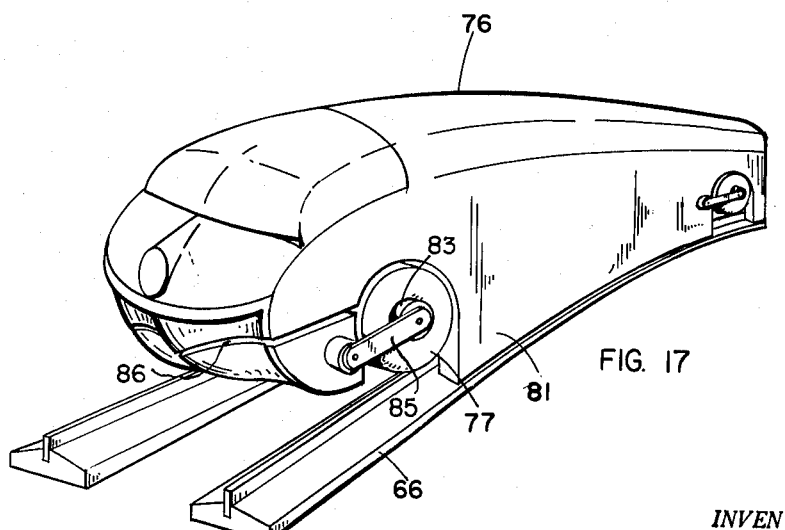
INVENTOR.
MILLARD F. SMITH
MARION L. ROBERTS
BY
ATTORNEY United States Patent Office 3,233,559
Patented Feb. 8, 1966

3,233,559
TRANSPORTATION MEANS
Millard F. Smith, Saugatuck, Conn., and Marion L. Roberts, Madison, Wis.; said Roberts assignor to Lor Corporation, Enid, Okla., a corporation of Delaware
Continuation of application Ser. No. 85,556, Jan. 30, 1961. This application Oct. 27, 1964, Ser. No. 407,954
12 Claims. (Cl. 105—1)

This is a continuation of application Serial Number 85,556, filed January 30, 1961, and now abandoned.

This invention relates to air-supported trains, and more particularly relates to trains which are adapted to travel on a cushion of compressed air jetted between either the rails or road bed of a railroad and fixtures underlying the train. Motive power for the trains of this invention is supplied by linear electric induction motors.

Air supported surface transportation vehicles, known as ground effect machines or air cushion machines, which levitate from the reaction of compressed air against a ground surface have heretofore been known and have utilized reaction motors or airplane propellers as propulsion means. The train of this invention is principally distinguished from such devices by the use of electric motor propulsion means.

The frictional resistances of levitation vehicles in passing over ground surfaces are very low and the velocities that can be obtained are high if the ground surfaces are sufficiently level to permit operation of the vehicles. Speeds of several hundred miles per hour are possible, there being no contact with the ground surface to impede movement or cause wear and tear on a vehicle.

Levitation vehicles may utilize low-velocity, low-pressure air issuing from either an open-bottomed chamber or a chamber having an annularly slotted bottom, or may utilize relatively higher pressure air issuing from jets directed substantially vertically downward through a shoe member. The former class of vehicles includes devices known as plenums, annular jets, and labyrinth seals, and the latter class includes air-bearing vehicles. The train of this invention utilizes air bearings, one embodiment of the device hereof utilizing air bearings between railroad tracks over which the vehicle travels and rail shoes affixed to the vehicle, and another embodiment utilizing air bearings between the surface of a level concrete road bed and the underside of the coaches of a train of special configuration adapted to travel on the road bed. The rail shoes of the train of the first embodiment mentioned embody compressed air conduits which exhaust through flange members disposed a fraction of an inch above the railroad tracks over which the train travels. High-pressure, high-velocity air is conveyed through the conduits substantially perpendicularly to the top of the railroad tracks so that the air exhausts to atmosphere by passing between the flange members and the railroad tracks thereby providing high-pressure streams of compressed air sufficient to support the train slightly above the railroad tracks. In the latter embodiment the air passes between the bottom of the coaches of the train and a level railroad bed.

The propulsion means of the train of this invention comprise developed linear electric induction motors which may be energized either by electric power generators in the train, or by electricity in third-rail means or overhead lines.

It is an object of this invention to provide a train propelled by a linear electric induction motor and supported by air bearings.

It is another object of this invention to provide a comparatively light-weight surface transportation vehicle capable of traveling at high velocity.

It is another object of this invention to provide mass transportation means which are more efficient in operation than are existing transportation facilities.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a perspective view of one embodiment of a train of this invention adapted to travel on conventional railroad tracks;

FIGURE 2 is a transverse cross-section of the train of FIGURE 1;

FIGURE 3 is a longitudinal cutaway section of a portion of the train of FIGURE 1;

FIGURE 4 is a transverse cross-section of another embodiment of a train of this invention adapted to travel on conventional railroad tracks;

FIGURE 5 is a transverse cross-section of one embodiment of a levitation shoe of this invention;

FIGURE 6 is a transverse cross-section of another embodiment of the levitation shoe of this invention;

FIGURE 7 is a plan view of an induction motor having variably spaceable pole pieces;

FIGURE 8 is a perspective view of another embodiment of the train of this invention wherein the train is adapted to travel on a platform railroad bed;

FIGURE 9 is a transverse cross-section of the train in railroad bed of FIGURE 8;

FIGURE 10 is a transverse cross-section of another embodiment of the concrete railroad bed of this invention;

FIGURE 15 is a cross-sectional elevation of an embodiment of this invention wherein two linear induction motors are provided in parallel arrangement;

FIGURE 16 is a cross-sectional elevation of an ambodiment of this invention similar to FIGURE 15 wherein a different propulsion means is illustrated;

FIGURE 17 is a perspective view of another embodiment of a train of this invention.

Figure 11:
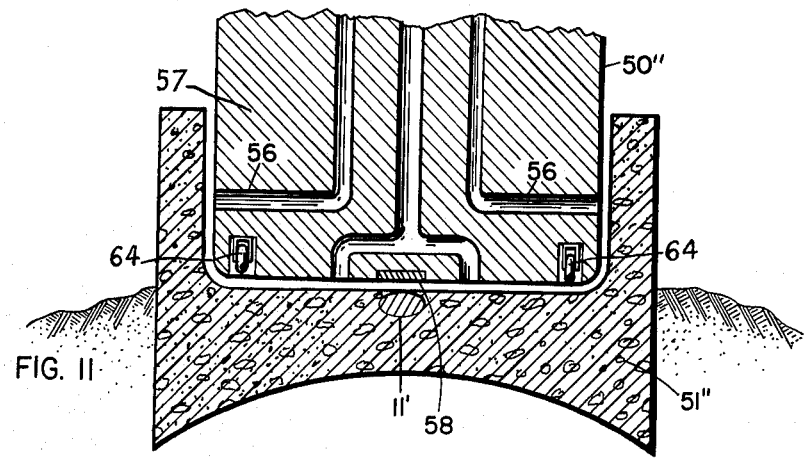
FIGURE 11 is a transverse cross-section of another embodiment of the train and railroad bed of this invention.

In FIGURE 1 is shown a schematic view of train 10 traveling on conventional railroad rails 12 with armature 11 provided as shown. Armature 11 is fixedly attached to the cross ties of the railroad and is comprised of a non-magnetic, upstanding strip of copper, aluminum or other conductive and preferably corrosion-resistant non-magnetic metal or alloy. Armature 11 may be spiked to the railroad ties in a manner similar to the manner in which rails 12 are affixed to the ties. The particular material from which armature 11 is made will depend in part upon the particular application to which the train using armature 11 will be put; i.e., a material of relatively high resistivity is desirable for switch yard operations and for initial starting of trains while relatively lower resistivity metal is desirable for cross country operation. Armature 11 may be segmented with air gaps spaced periodically along the length thereof or may be welded into a continuous structure. If armature 11 is made as a continuous structure vibration in the linear electric propulsion motor of the train is minimized, but structural buckling or warping of armature 11 may result from thermal expansion. Therefore, it is desirable to provide gaps in armature 11 only as frequently as is necessary to prevent structural distortion. It is desirable to insulate armature 11 from ground in areas where substantial precipitation occurs to minimize current leakage with resulting waste of electrical energy; however, wooden cross ties are usually sufficient to insulate the armature in other areas.

In FIGURE 2 is shown in transverse cross-section train 10 supported on rails 12 by means of a high pressure layer of air between rails 12 and rail shoes 13. Conduit 16 is provided for conveying compressed air from compressor means (not shown) in train 10 to rail shoes 13. The compressed air is directed against the upper surfaces of rails 12 and in one embodiment (FIGURES 5 and 6) against the inner sides of rails 12 to provide an air bearing between rails 12 and rail shoes 13. Train 10 is enabled to pass along rails 12 a fraction of an inch thereabove without making contact therewith by the provision of the air bearing so formed. Running gear is eliminated from train 10 and the train is capable of traveling at speeds in excess of 100 miles per hour silently and with minimal vibration in a manner superior to any commercial rail vehicle now operating. The air pressure necessary to operably support train 10 above tracks 12 is dependent upon the weight of the train and the area under rail shoes 13. Pressures of from 10 pounds to 100 pounds per square inch guage are optimum and greater pressures are feasible. Air may be provided at rail shoes 13 by adapting compressed air lines for brakes now used on railway rolling stock. The provision of compressed air lines and compressor equipment will be obvious to those skilled in the construction of railway vehicles and a detailed description of such equipment is not included here.

As shown in FIGURE 3 stators 21 and 21' depend vertically from the underside of train 10 on either side of armature 11. Stators 21 and 21' are linear electric motor primary members and are preferably wound for three-phase current, but may be wound for current of any other number of phases. Windings 16' are shown on the inward facing sides of stations 21 and 21' with pole pieces 16 disposed alternately with the windings along the length of stators 21 and 21' in conventional manner. Stators 21 and 21' may be of conventional construction or in one embodiment (FIGURE 7) of this invention may be longitudinally adjustable to provide variable equidistant spacing between windings 16' and pole pieces 16. Stators 21 and 21' can extend the full length of a train or any portion thereof. Stators 21 and 21' may be wound substantially identically to the energizable motor elements disclosed in United States Patent 2,666,879, F. W. Godsey, Jr., et al., January 19, 1954.

Armature 12 is centered between stators 21 and 21' to prevent short circuiting of either stator. In order that armature centering is effected it is necessary that all instances and at all places along armature 12 wherever there is a north pole on one side there shall be a south pole of substantially equal strength exactly opposite the north pole on the other side and in which case stators 21 and 21' must be so disposed that each pole of each stator is substantially opposite a corresponding pole of the other stator throughout the entire length of the motor. Because armature 12 is comprised of a non-magnetic material, poles of like polarity are induced by stators 21 and 21' in armature 11, and armature 11 is repelled from the stator members. When the repelling force of each stator is equal to that of the other, armature 11 will remain centered between the stators and any force tending to displace armature 11 will be counteracted by a force which increases in proportion to the off-center displacement of armature 11 between stators 21 and 21'. Armature 11 extends suitable distances above and below stators 21 and 21' to provide ample room for flow of induced eddy currents.

The operating characteristic of an electric induction motor is determined in part by the resistivity of the armature, an armature of relatively high resistivity providing a greater slip, and therefore increased starting force, in comparison to an armature of lesser resistivity. When a train has attained speed it is desirable that the resistivity of armature 11 be relatively less than that of an armature used in switching or starting trains. The effects produced by the resistance of an armature in an induction motor are well known in the art and will not be described here. Armature 11 should be comprised substantially, and preferably all together, of non-magnetizable material so that the armature will have an extremely strong self-centering action and remain centered between stators 21 and 21'. Armature 11 may be either a solid plate of non-magnetizable metal, or may be a plate of foamed metal such as foamed copper or foamed aluminum, or may be of grid structure of other operable configuration. In switching yards and the like it is desirable that armature 11 may be provided with cooling fins, perforations, or other features of suitable configuration to provide a large surface area for radiant and conductive cooling.

When it is desired to remove train 10 from operation or during station stops, etc., wheels (not shown) may be lowered into contact with rails 12 to support train 10. It is also possible to stop the flow of air through conduit 16 and enable rail shoes 13 to rest directly on rails 12. The latter measure can also be taken when it is necessary to effect drastic braking at times of emergency to augment the braking action effected by the linear induction motor when the current is reversed therein.

Stators 21 and 21' may be wound with polyphase windings preferably of three-phase, permissibly of two phases or even of single-phase current. The effect of the windings is to produce a progressively traveling field so that successively following north and south poles travel along the wound stator at a rate which is necessarily higher than the rate at which train 10 is to be drawn along. Because the traveling field in stator 21 and 21' is traveling faster than train 10 there are set up eddy currents in armature 11 which react with the traveling field to powerfully draw train 10 along track 11 and tend to move train 10 at a speed approaching the synchronous speed of the motor, which is identical to the speed of movement of the traveling field. The number of poles which may be employed in the motor of train 10 is a matter of choice and will be determined by the power and velocity with which train 10 is to be propelled.

It is an important feature of this embodiment of the invention that armature 11 be not only non-magnetic itself, but that it have very little or no iron or magnetizable material associated with it. If there were any magnetizable material in armature 11, or if magnetizable material ever got closer to one of the poles, it would be attracted to a pole of stator 21 or 21', with a force which would be larger than the attractive force of the other pole and would force the armature into contact with the stator member thereby short-circuiting the latter. With an altogether non-magnetizable armature, there is no such de-centering force other than lateral inertia force of the moving train tending to move the armature out of a central position between the two stators.

To brake train 10 current flow in stators 21 and 21' may be reversed; or in a non-preferred embodiment direct current from a source extraneous to the alternating current source heretofore mentioned may be switched into the windings of members 21 and 21' thus causing build up of direct current flux at an exponential rate so that a direct current field wherein opposite poles have like polarity will be strongly established and will rapidly decelerate train 10.

In FIGURE 4 is shown a non-preferred embodiment of this invention wherein a linear electric induction motor is provided which has a substantially magentizable flat horizontally disposed armature 31 fixedly attached to concrete or other insulating structure 32. Armature 31 may comprise a cage secondary motor member wherein conductors such as foamed aluminum or copper may be integrally cast in a plate of magnetizable material. Armature 31 may also be comprised without magnetizable material and be configured as a cage-like grid structure or as a solid plate of foamed aluminum of other conductive material as shown in FIGURE 4. The voltage induced in the secondary causes eddy currents to flow therein and interact with the primary field to provide a propulsive force for train 10'. Primary winding 33 in train 10' is disposed above stator 31 separated therefrom by an air gap 38. The disposition of stator and armature and the conductors thereof may be substantially as disclosed in United States Patent No. 2,404,984 issued to F. B. Powers July 30, 1946. A magnetizable armature secondary is not preferred because the downward magnetic force acting on the train substantially increases the loading on compressed air layer 15' between rail shoe 36 and rail 35 and does not provide the self-centering action of the motor heretofore described.

In FIGURE 5 is shown a detailed view of rail 35, rail shoe 36, and compressed air layer 15' of FIGURE 4. Rail 35 is a conventional railroad rail and rail shoe 36 is comprised preferably of an abrasion resistant structural material such as steel- or chromium-clad low-density metal or other structural material as may be desired with air passages 37 passing therethrough directed toward the upper surface of rail 35 and toward the inner side of rail 35 so as to provide a high-pressure air layer between rail shoe 36 and rail 35. Shoe 36 is provided only with an inside depending flange so as to enable it to be used with existing railroad switching facilities, whereas rail shoes heretofore known for use with air-supported rail vehicles have been configured with flanges depending on both sides of the rail thereby preventing their use with existing railroad switching facilities.

In FIGURE 6 rail shoe 36' is shown as a modification of rail shoe 36 of FIGURE 5 wherein an outward extending flange 37 disposed below the head of rail 35 and adjacent the inner side thereof is provided to prevent rail shoe 36' from leaving rail 35 and yet not appreciably increasing the downward pressure on rail shoe 36'. As may be seen from FIGURE 6, a substantial pneumatic counterforce to pressure on the top of rail 35 will not develop except when rail shoe 36' is spaced an excessive distance above rail 35.

In FIGURE 7 is shown a linear induction motor provided with means for transversing stators 41 longitudinally along armature 11 to provide variable spacing of equidistant poles and windings in a linear electric induction motor. Stators 41 comprising primary windings and core members are fixedly mounted in members 44 and 44' which latter members are longitudinally slidably on fixed support rods 26'. Movable connecting rods 46 are pivotally attached to slidable blocks 47 disposed in stringers 48. Blocks 47 are slidably moved within stringers 48 by traversing stringers 48 transversely of the motor structure by means of double-acting, double-piston hydraulic cylinder 49. Blocks 47' are fixedly attached to stringers 48. In operation, when hydraulic cylinder 49 is actuated to traverse outwardly stringers 48, blocks 47 are thereby caused to move correspondingly closer mutual adjacency and stators 41 connected to blocks 47 by connecting rods 46 are correspondingly moved into mutually closer adjacency to provide shorter but at all times equidistant spacing between stators 41. A traveling field in stators is thereby decreased in linear velocity along armature 11 when stators 41 are moved into mutually closer adjacency. The embodiment shown in FIGURE 7 may be used with a generator having frequency control or may be used to particular advantage with a fixed frequency energizing current.

In non-preferred embodiments it is also possible to utilize a variable pole stator by providing separate independently energizable windings thereof or by providing switches for changing the number of windings in operation. Thus, in FIGURE 2 "stator 21" might be energized by means of a circuit independent of winding 21' or could be contained in the same circuit with means for switching it therefrom.

In preferred embodiments of this invention the frequency of the polyphase energy which energizes the developed induction motor windings may be variable. This can readily be done by changing the speed of the generator furnishing the energy. When the electrical generating means is self-contained in the rail vehicle frequency variation can be accomplished without affecting other facilities as would be the case if transmission line current were varied.

In FIGURES 8 and 9 another embodiment of this invention is shown wherein train 50 is supported above platform 51 and is enabled to travel therealong by means of an air bearing comprising a layer of air at greater than atmospheric pressure between the bottom of train 50 and the top of platform 51. As shown in FIGURE 9 ducts 53 are substantially equally spaced on the undersurface of train 50 to provide a continuous air cushion of substantially lower pressure than is provided in the embodiment of this invention shown in FIGURE 1. The top surface of platform 51 is of V configuration as shown in FIGURE 9, with drainage gutter 55 disposed under armature 11 to permit surface water to flow from platform 51. A self-centering action of train 50 relative to non-magnetic armature 11 is augmented by the shape of the upper surface of platform 51 wherein train 50 in moving to an off-center position with respect to armature 50 is elevated above the position it assumes when centered and the action is a self-correcting one, the force of gravity contributing to the force causing the train to center on the armature.

In FIGURE 10 is shown platform 51', similar to platform 51 of FIGURE 9, but configured with a horizontal upper surface, thereby eliminating the necessity for providing a drainage gutter under armature 11'. Train 50' is correspondingly configured having a horizontal undersurface and is dependent upon the strength and rigidity of armature 11' in platform 51' for guidage.

In FIGURE 11 is shown another embodiment of this invention wherein train 50" and track means 51" are shown in transverse cross-section. Track 51" comprises a U-shaped channel of a material such as concrete. The material may be reinforced and pre-stressed if desired. It is preferred that air entrained concrete be provided to eliminate the need of expansion joints in track 51" and thereby enable a continuous unjointed structure to be provided. Armature 11" is embedded or otherwise fixedly secured to track 51" and may be configured as a cage or plate structure similar to those described relative to FIGURE 4 or may comprise a conventional electric cable. The cable may be constructed to include magnetizable wires if desired, although it is not necessary to provide them. It is preferable that any paramagnetic material be softened to provide the least possible residual magnetism.

If desired, the armature secondary motor member might be provided with windings and be connected to the primary windings by sliding commutator means (not shown) to provide a developed series wound motor, or might be energized directly from a transmission line to provide a compound or shunt wound motor of if a direct current is used, a direct current motor may be provided.

Train 50" of FIGURE 11 comprises tower portion 57 of a low density buoyant material, preferably foam metal with air conduits 56 therethrough. Motor primary 58 comprises a plurality of wound energized stators and pole pieces of any of the several configurations as above described. At the lateral extremities of train 50" a pair of retractable wheels 64 are shown in retracted position. Wheels 64 may be lowered on train 50" during station stops or at times when train 50" is inoperative. Wheels 64 may also be employed to support all of train 50″ or portions thereof at times when the air suspension system fails or during off the track operation. In order to provide wheels of small size and weight solid rubber tires on light weight metal alloy wheels are preferred, although metal or plastic wheels or inflated or foam resin filled wheel mounted tires may be used. Any conventional wheel lowering means may be provided such as the hydraulic and mechanical landing gear devices used on aircraft. Such devices are well known in the art and are not described here.

Figure 12:
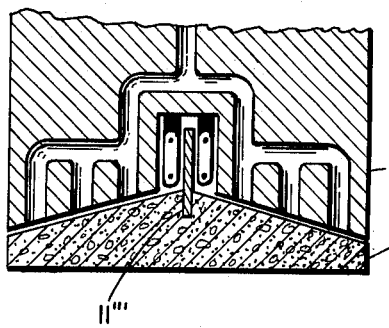
FIGURE 12 is a transverse cross-section of another embodiment of a portion of the train of this invention.

In FIGURE 12 is shown another embodiment of a portion of a train and roadbed of this invention. Roadbed 51‴ is configured with a crown so as to be self draining and to enable train 50‴ to be self centering on armature 11‴ by causing an elevation shift of train 50‴ when lateral movement of the train occurs. Either track 51″ of FIGURE 11 or roadbed 51‴ of FIGURE 12 may comprise one member of a parallel set of track members similar to tracks 12 of FIGURE 1 or may comprise a single roadbed extending substantially the width of the train similar to platform 51 of FIGURE 8.

Figure 13:
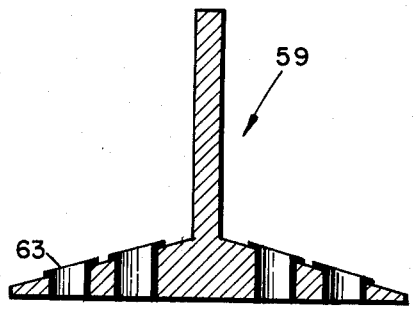
FIGURE 13 is a transverse cross-section of an armature of a linear electric induction motor of this invention.

In FIGURE 13 is shown armature 59 having a configuration of an upstanding web and a horizontal bottom flange, the flange being provided so that armature 59 may be spiked directly to ties of the railroad track or bolted into a concrete railroad bed. It may be preferred to coat the undersurface of armature 59 with an insulating material such as mastic or bitumen or plastic material, or it may be sufficient to spike armature 59 directly to railroad ties if current leakage is not excessive. Nonconductive bushings 63 may be provided as shown through which spikes or bolts may be inserted.

Figure 14:
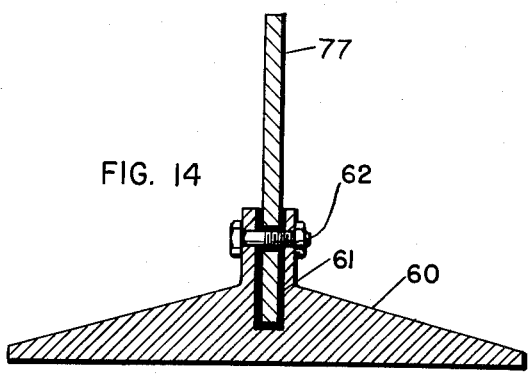
FIGURE 14 is a transverse cross-section of another embodiment of an armature of a linear electric induction motor of this invention.

In FIGURE 14 is shown tie plate 60 in conjunction with upstanding non-magnetizable armature. Armature 77 is placed within slot 61 of tie plate 60 and bolted therein by means of bolts through holes 62. The assembly may then be spiked to a railroad tie in operable manner. It may be desirable to insulate armature 11 from tie plate 60 by means of suitable coating material or to insulate the assembly from ties in a manner similar to that described above. A certain amount of magnetic flux in the armature assembly may be desirable to exert a slight downward stabilizing force of a train, and tie plate 60 may be comprised of magnetizable material, if desired.

It is apparent that a large number of suitable configurations for tracks, road beds and rail shoes for use with an air-supported train may be provided and the foregoing description illustrates only a few operable configurations. Linear electric induction motors other than those above described may also be used herein such as those described in United States Patent 2,404,984, F. D. Powers, July 30, 1946, and in 2,412,512, M. F. Jones, April 15, 1950.

In FIGURE 15 is shown the lower portion of train 65 of this invention which is preferably comprised of buoyant water-tight foamed aluminum configured with air passages 79 therethrough as shown. A set of parallel extending tracks 66 each provided with an armature 78 is disposed below train 65. Fixed nozzles 67 and variable direction nozzles 67′ are intermediately disposed between outboard depending air suspension and propulsion means 81 of train 65 each of which is similar to track 51‴ of FIGURE 12. The under structure of train 65 defines a plenum chamber into which nozzles 67 and 67′ exhaust to provide emergency suspension and propulsion for train 65.

Rail vehicle 10″ of FIGURE 15 is adapted to travel along highways or secondary roads or along unimproved roads and over water courses such as streams and rivers if necessary during emergency operations when portions of railroad track has been destroyed or distrupted by natural causes, sabotage or military action. When train 65 is traveling along rails 66, air is ducted against the surface of rail 66 only. However, when it is necessary for train 65 to leave tracks 66 and travel along a highway or secondary road or to ford a stream, comparatively low pressure air from reserve capacity compressor equipment (not shown) in train 65 may be ducted through nozzles 68 to provide a cushion of air which extends beneath the entire undersurface of train 65. Some nozzles such as nozzles 67′ are preferably subject to directional control so that air may be provided for propulsion of train 65. The reaction of rearwardly jetted air, for instance, causes train 65 to be moved forwardly by reaction of compressed air. Nozzles 67′ are selectively adjustable so that the direction of nozzle 67′ can be reversed to brake train 65 or can be directed sideways to enable train 65 to be turned or moved to the side. Controlled distribution of air to nozzles 67 and 67′ enables train 65 to be maneuvered around or over bumps, ditches, or similar anomalies in an otherwise smooth surface.

In FIGURE 16 is shown train 65′ and rails 66 similar to FIGURE 15 and wherein train 65′ is equipped with means for providing directional control by deflecting air jetted from fixed directional nozzles 82. Beneath nozzles 82 are disposed two sets of louvered vanes 70 and 71. Vanes 70 are disposed longitudinally of train 65 and are adjustable transversely thereof to direct air from nozzles 82 toward one side or the other under train 65. Vanes 70 are rotatively supported by frame members 72 and are biased by movement of rods 73 which connect to each of vane members 70. Vanes 71 are disposed immediately below vanes 70 and are oriented transversely to train 65′ and are mounted similarly to vanes 70. Vanes 71 may be biased so as to direct air from jets 82 rearwardly or forwardly beneath train 65′ for providing directional propulsion. In a preferred embodiment, valve means are provided to regulate the flow of compressed air to each end of each car of the train to enable one end of a car to be raised a greater distance than the other and facilitate passage of the train over obstacles or depressions. Such valves may be conventional throttle valves provided at the compressor unit or elsewhere as may be desired and are not shown herein for the sake of clarity. It is desirable to provide a plurality of plenum chambers beneath each car to enable distribution of air pressure beneath a car to be easily controlled. Adjacent chambers preferably are constructed with common wall disposed transversely of the car.

The provision of nozzles 67 and of louvered vanes 70 and 71 enables train 65 to be propelled over land or water by an air cushion confined by a cavity formed between the rail shoes, the bottom of train 65 and the ground surface. The cavity so formed comprises a plenum into which low-viscosity, low-pressure air may be directed to provide support in a manner which is well known in the art.

In a preferred embodiment of this invention, the lower portion 75 of train 65′ shown in FIGURE 16 is comprised of a low-density rigid light weight structural material such as foamed aluminum. Foamed aluminum is described in United States Patent 2,751,289, John Elliott, June 19, 1956. Foam aluminum having a density of from 20 to 30 pounds per cubic foot is preferred but densities of from 12 pounds to 60 pounds per cubic foot may be used to provide a buoyant structural material which enables train 65 to stay afloat even if water enters the compartments of the train during a water crossing.

In the embodiment of the invention described and illustrated in FIGURES 15 and 16 suspension and propulsion means 81 may be disposed beneath a car of a train along the substantial length of the car as shown or at intermittent points on either side of the car and extend several feet lengthwise of the car at each point. The distance through which means 81 extends will be limited by the curvature of tracks 66 and by the clearance between the primary and secondary motor elements. Means 81 when disposed continuously along the length of train 65 are preferably provided with primary motor members 80 therewithin at only two locations on either side of each car of train 65 thereby enabling a narrower air gap between motor members to be provided while enabling suspension means 81 to extend the length of each car of train 65 thereby to form the sidewalls of a plenum chamber disposed underneath the car. A similar depending wall member may be provided across the ends of each coach to completely define the plenum chamber which enables the train to be used as an off-the-track vehicle. It is also preferred that the front-most portion of train 65 be configured as shown in FIGURE 17 inclined from the top rearwardly and downwardly to the bottom of the train to provide a front surface which deflects air downward and underneath train 65 thereby augmenting the air pressure in the plenum chambers.

In FIGURE 17 is shown another embodiment of the invention wherein train 76 is provided with outwardly disposed suspension and propulsion means 81 as illustrated in FIGURES 15 and 16 and tracks 66 also as illustrated therein. In train 76 a plenum chamber or nozzles adjacent the understructure of the train is not provided, but emergency suspension and propulsion wheels 77 are shown in retracted position. Wheels 77 are retractably mounted by rotatable arms 85. Wheels 77 and arms 85 may be conventional retractable landing gear as used on large aircraft. As illustrated in FIGURE 17 rotatable arms 85 are substantially horizontally disposed when wheels 77 are in retracted position and depend substantially vertically when wheels 77 are lowered. Propulsion for wheels 77 is preferably provided by air motor 80 with integral gear reduction means mounted axially adjacent wheel 77. Electric or hydraulic motors could also be used as could conventional chain or rotating shaft drives. However, high pressure air is readily directed from means 81 to motor 80 and a minimum of additional accessory equipment is necessary for wheel propulsion means if air motors are used.

Tires 77 may be deep cleated for use in water to provide paddle wheel propulsion. Tires 77 may also extend across the width of train 76 similar to flotation tires which are widely used in sand or snow terrain. The use of such tires, however, requires that at least the first tire of the train be steerable. The yoke comprising arms 85 on either side of train 76 may be rotatable with respect to the train at surface 86. If conventional tires are provided, it is desirable to provide arms 85 which are rotatable about the longitudinal axes thereof to provide optimum maneuverability to the train. Such a mounting may be similar to that of a steerable nose wheel of an aircraft.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. An air-supported surface transportation vehicle adapted to travel on a roadbed provided with at least one developed electric induction motor secondary member, said vehicle comprising in combination a compartment adapted to contain cargo and personnel, a plurality of levitation members disposed beneath said compartment in fixed relation thereto, said levitation members comprising surfaces adapted to be disposed above surfaces of said roadbed and to be separated therefrom by a layer of air which is compressed to a pressure sufficiently greater than atmospheric to cause said vehicle to levitate, said air being communicated between said surfaces through said levitation members, compressed air supply means for providing high pressure compressed air to said levitation members, means for conveying compressed air from said compressed air supply means to said levitation members, at least one developed electric induction motor wound primary member disposed beneath said compartment in fixed relation thereto, electric current supply means for supplying energy to said developed electric induction motor primary member, means for conducting electric current to said induction motor primary member to provide a traveling field therein, said primary motor member being disposed in parallel non-contacting adjacency to said secondary motor member, vehicle propulsion being provided by current flowing in said primary motor member and by current induced in said secondary electric induction motor member, vehicle suspension being provided by means of compressed air exhausted through said levitation members against said roadbed.

2. The article of claim 1 wherein said roadbed is a railroad and wherein said levitation members are configured with a substantially horizontal portion disposed above a track of said railroad and a depending portion disposed adjacent the inside surface of said track.

3. A train comprising at least one vehicle, said vehicle comprising in combination a compartment adapted to contain material and personnel, levitation means disposed beneath said compartment and affixed thereto said levitation means adapted to be separated from surfaces over which said train passes by a layer of air pressurized sufficiently to cause said train to levitate, said compressed air being communicated through said levitation means into said layer of air, compressed air supply means, conduit means for conveying compressed air from said compressed air supply means to said levitation means, at least one wound primary member of a developed electric induction motor, said primary member being disposed longitudinally of said compartment and attached thereto immediately therebelow, electric current supply means for supplying energy to said developed electric induction motor primary member, means for supplying a continuously travelling electric field current to said induction motor primary member for conducting electricity to said primary motor member, vehicle propulsion being provided by developed electric induction motor means, vehicle suspension being provided by said levitation means.

4. A surface transportation vehicle comprising in combination at least one car, said car comprising a compartment for containing material and personnel, levitation means beneath said compartment for exhausting compressed air downwardly, said levitation means comprising a plurality of nozzles communicating therethrough, compressed air supply means for providing high pressure compressed air to said levitation members, means for conveying compressed air from said compressed air supply means to said levitation means, at least one developed electric induction motor wound primary member extending longitudinally of said compartment therebelow and fixedly disposed relative thereto, means for conducting electricity to said motor member, said electricity in said primary motor member providing propulsion for said car, said compressed air providing an air bearing between said car and said surface thereby suspending said car.

5. The article of claim 4 wherein said nozzles are disposed substantially evenly over the undersurface of said car.

6. The article of claim 4 wherein said nozzles are disposed along the outer extremity of said car.

7. The combination of a levitation train and of track means, said train comprising in combination a plurality of pivotally connected cars, each of said cars comprising in combination a compartment for containing personnel and cargo, at least one levitation means depending from said compartment in parallel longitudinal arrangement thereunder and fixedly attached thereto, compressed air supply means, means for conveying compressed air to said levitation means, nozzle means through each said levitation means for conveying compressed air, a plenum chamber beneath said compartment, said levitation means partially comprising the wall of said plenum chamber, means for conducting compressed air into said plenum chamber, at least one developed electric induction motor primary member disposed beneath said compartment, electric current supply means, means for providing current at said primary motor member, said levitation means providing suspension for said vehicle above railroad rails, said plenum chamber providing suspension for said vehicle above ground and water surfaces, said track means comprising in combination a plurality of elongated members disposed below said levitation means in parallel rear adjacency thereto and fixedly secured to ground, at least one developed electric induction motor secondary member disposed adjacent said primary motor member and fixedly secured to ground.

8. The device of claim 7 wherein a first set and a second set of louvered vanes are provided in said vehicle within said plenum chamber, said first set of vanes being tiltable substantially rearwardly and forwardly about a longitudinal axis therethrough, said second set of louvered vanes being tiltable substantially sidewardly about a longitudinal axis therethrough, said vanes causing downward-moving air in said plenum chamber to be deflected to propel said vehicle.

9. The device of claim 1 wherein said levitation means are disposed substantially along the sides of said car and wherein said track means comprise two continuous elongated structures adjacent said levitation means against which compressed air issuing from said nozzles reacts.

10. The train and track device of claim 7 wherein said secondary motor member is disposed integrally with said track means and each said primary motor member is disposed integrally with each said levitation means.

11. The device of claim 10 wherein said track means comprises at least two elongated parallel extending structures disposed below the side extremities of said train.

12. A train adapted to be supported above track surfaces by compressed air and adapted to be propelled by developed electric induction motors, said train comprising at least one compartment adapted to contain cargo and personnel, at least a lower portion of said compartment being comprised of buoyant material, a plurality of nozzles affixed to said compartment for exhausting compressed air beneath said train, said train adapted to travel along an elongated structure having a regular surface configuration, at least some of said nozzles being variable direction nozzles, air exhausting beneath said train from said nozzles providing suspension for said train in said structure, said variable direction nozzles providing emergency propulsion for said train, energizable wound developed electric induction motor primary members affixed to said compartment therebeneath to provide electric motor propulsion means for said train, said track comprising at least one elongated structure having a regular surface configuration affixed to ground and at least one developed induction motor secondary member parallel therewith and affixed to ground.

References Cited by the Examiner

UNITED STATES PATENTS

| 1,020,942 | 3/1912 | Bachelet | 104—148 |
| 1,020,943 | 3/1912 | Bachelet | 104—148 |
| 1,698,482 | 1/1929 | Nicin | 180—7 |
| 1,754,685 | 4/1930 | Kanter | 310—13 |
| 1,916,491 | 7/1933 | Rose | 310—13 |
| 2,428,570 | 10/1947 | Jones | 310—10 X |
| 2,511,979 | 6/1950 | Goddard | 104—138 |
| 2,609,413 | 9/1952 | Nemeth | 310—10 |
| 3,013,505 | 12/1961 | Burke | 104—155 |

FOREIGN PATENTS

| 1,233,478 | 8/1939 | France. |

ARTHUR L. LA POINT, *Primary Examiner.*

EUGENE G. BOTZ, *Examiner.*